United States Patent [19]

Krasij et al.

[11] Patent Number: 5,110,691
[45] Date of Patent: May 5, 1992

[54] FUEL CELL COMPONENT SEALANT

[75] Inventors: Myron Krasij, Avon; Paul R. Watson, Marlborough, both of Conn.

[73] Assignee: International Fuel Cells Corporation, South Windsor, Conn.

[21] Appl. No.: 642,260

[22] Filed: Jan. 16, 1991

[51] Int. Cl.⁵ .............................. H01M 2/08
[52] U.S. Cl. ........................ 429/35; 429/30; 429/46
[58] Field of Search ................. 429/35, 36, 174

[56] References Cited

U.S. PATENT DOCUMENTS 3,395,047 7/1968 Terry et al. ........................ 429/35
4,863,535 9/1989 More .................................. 156/34

OTHER PUBLICATIONS

Ethylene-Propylene (EPDM) Latex EP-603A, Burke-Palmason Chemical Company, Feb. 1987, pp. 1-5.
Butyl Latex BL-100, Burke-Palmason Chemical Company, Aug. 1984, pp. 1-18.

*Primary Examiner*—William R. Dixon, Jr.
*Assistant Examiner*—Margaret V. Einsmann
*Attorney, Agent, or Firm*—Pamela J. Cubelo

[57] ABSTRACT

A butyl rubber/ethylene propylene latex sealant for use in fuel cells is disclosed. The sealant is comprised of between about 50 wt % and about 99 wt % butyl rubber and about 10 wt % to about 50 wt % ethylene propylene latex. Conventional fillers can be added to the sealant to attain or enhance various properties such as: desired viscosity, specific gravity, stability, strength, oxidation resistance, and accelerated cure.

12 Claims, 2 Drawing Sheets

FUEL CELL COMPONENT SEALANT

This invention was made with Government support under a contract awarded by the Department of the Air Force. The Government has certain rights in this invention.

TECHNICAL FIELD

The present invention relates to a sealant, and especially to sealants useful in alkaline fuel cells.

BACKGROUND ART

Fuel cell stacks typically consist of a plurality of fuel cells connected in series through a load. Each fuel cell has a number of components including: a cathode and an anode with an electrolyte disposed therebetween, a cathode chamber, and an anode chamber. Around each fuel cell component is a frame. Within the fuel cell, a fuel, such as hydrogen, and an oxidant, such as oxygen, react to produce electricity.

For example, in an alkaline fuel cell, which typically operates at atmospheric pressure and temperatures between 140° F. and 250° F., hydrogen reacts with oxygen to form water, heat, and electricity. At the cathode, water, free electrons, and oxygen react to form hydroxide ions. The hydroxide ions migrate through the electrolyte to the anode. At the anode the hydroxide ions react with hydrogen to produce water, heat, and electricity. In these fuel cells, a strong aqueous solution of potassium hydroxide serves as the electrolyte.

Typically, the fuel and oxidant enter the respective chambers within the fuel cell through passages in the frames which surround the various components. Since direct contact between the fuel and oxidant (usually hydrogen and oxygen) can cause an explosion, it is extremely important to prevent leakage between the passages. Additionally, since potassium hydroxide is a strong caustic and toxic if inhaled, it is also very important that it be carefully sealed within the fuel cell.

Presently, two sealants are conventionally employed to prevent leakage within or out of fuel cells; a rubber sealant and an epoxy coated fabric sealant. Both sealants require a labor intensive application, are expensive, and require a thick frame (a problem where volume and weight are limited), with the rubber seal also requiring an additional molding step.

The epoxy coated fabric is used to provide an edge seal 5 to the frame 1 (FIG. 1) and to form the frame of the electrode assembly by manual interleaving the electrodes 12, matrix 14, and electrolyte reservoir plate 16 between layers of epoxy-coated fabric and bonding these components to the frame with heat and pressure.

With respect to the rubber sealant, a rubber adhesive (A; see FIG. 2) is placed in a groove 20 located in the frame 25 of the component. An extruded bead of uncured rubber B is then placed in the groove. The rubber is compressed and heated to form a specific shape as is shown in FIG. 2. Once the rubber has been molded, the frames are fitted together. Generally, during maintenance of the fuel cell, when the components are separated the rubber pulls out of the groove, requiring the molding process to be repeated prior to reassembling the fuel cell.

What is needed in the art is a sealant for use in fuel cells which is convenient to use, inexpensive, does not require the use of a thick frame, is dependable, and which can be used in a potassium hydroxide environment.

The present invention discloses a sealant which can be used in a fuel cell to prevent leakage between component frames. This sealant, which is comprised of an essentially homogeneous mixture of about 50 wt% to about 90 wt% butyl rubber and about 10 wt% to about 50 wt% ethylene propylene latices, can be used in a caustic environment and at elevated temperatures.

Also disclosed is a fuel cell which utilizes said sealant as claimed. The sealant is used to prevent leakage of the fuel, oxidant, reaction products, and in some cases the electrolyte.

The foregoing and other features and advantages of the present invention will become more apparent from the following description and accompanying drawings.

BEST MODE FOR CARRYING OUT THE INVENTION

Figure 1:
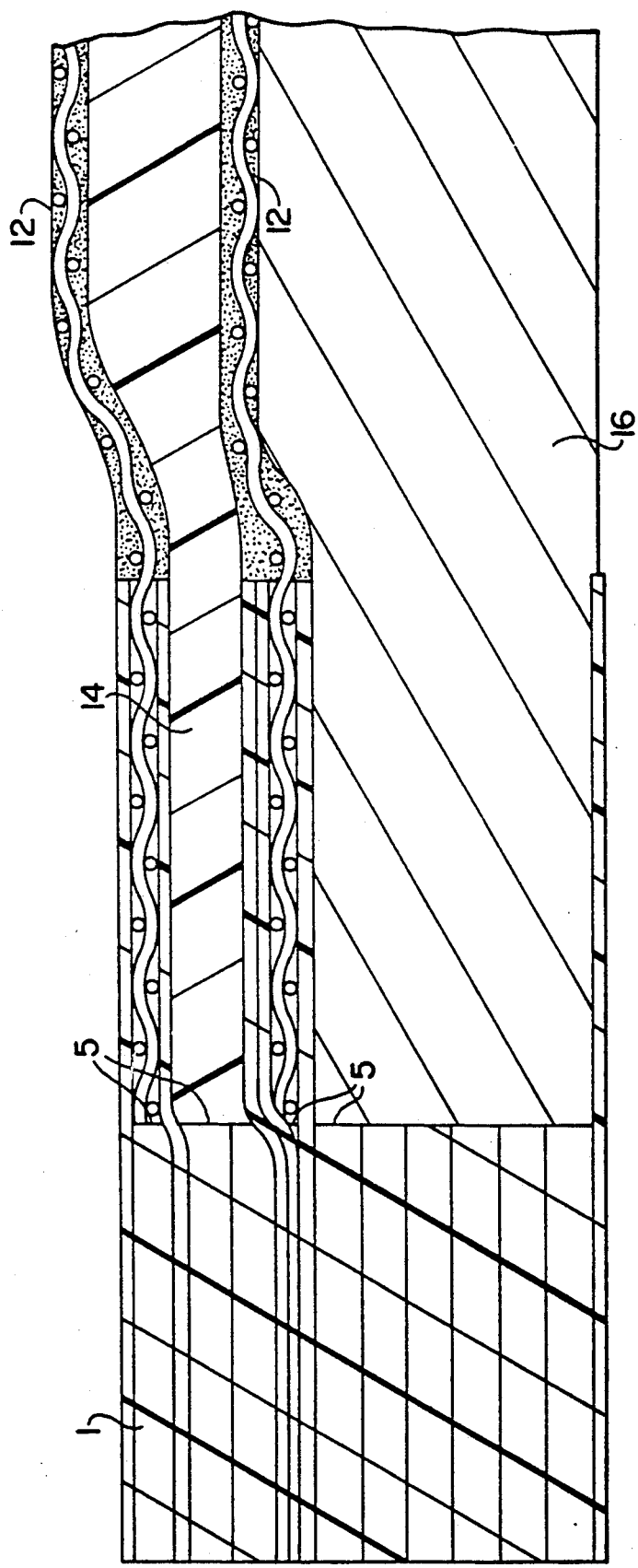
FIG. 1 is a schematic of the prior art epoxy coated fabric sealant used to form and edge seal and the fuel cell component frame.

The sealant of the present invention can be used in such applications as a face seal and as an edge seal on the frame portion of a framed component in a fuel cell stack. The sealant is comprised of a combination of isobutylene-isoprene copolymer (hereafter referred to as butyl rubber) and ethylene propylene diene terpolymer (hereafter referred to as ethylene propylene) latices. The butyl rubber imparts adhesion properties and compatibility with the fuel cell electrolyte. The ethylene propylene latex imparts high temperature compatibility. This sealant can easily be applied to a substrate by spraying, brush painting, or extruding in the form of a bead, among other conventionally known techniques.

Preparation of the sealant can be any conventional technique which attains an essentially void free sealant having the desired sealant consistency. One generic sealant preparation method comprises: mixing butyl rubber and ethylene propylene latices in a blender until a homogeneous mixture is formed, and then removing any air bubbles.

The butyl rubber, when mixed with the ethylene propylene latex, is preferably in the form of a latex, an aqueous suspension of about 60 wt% butyl rubber and about 40 wt% water (typically 62 wt% butyl rubber and 38 wt% water), due to ease of clean-up and reduced waste. Any type of butyl rubber which is stable in the fuel cell environment, and is capable of being applied in the form required, can be utilized. One example of a butyl rubber which is useful is butyl rubber BL-100 produced by Burke-Palmason Chemical Company, Pompano Beach, FL. the desired consistency of the final sealant and the amount of adhesion necessary. Typically, with respect to the butyl rubber/ethylene propylene latices mixture, between about 50 wt% and about 90 wt% butyl rubber is used, with between about 60 wt% to about 80 wt% preferred, and between about 70 wt% and 80 wt% especially preferred.

Typically, between about 10 wt% to about 50 wt% ethylene propylene latex is mixed with the butyl rubber, with between about 20 wt% to about 40 wt% preferred, and about 20 wt% to about 30 wt% especially preferred if the sealant is to be utilized in temperatures up to approximately 300° F. Greater than about 50 wt% ethylene propylene latex can retract from the adhesive strength of the sealant but may be suitable in some applications. One example of an ethylene propylene latex which is stable in temperatures up to 300° C. and the caustic fuel cell environment is ethylene propylene latex EP-603A (ethylene propylene diene terpolymer) produced by Burke-Palmason Chemical Company.

Extended sealant life, and improved creep and strength properties can be obtained by adding conventional fillers to the butyl/ethylene propylene mixture. Although fillers are optional, they are preferred to attain or enhance various sealant properties including: desired viscosity, specific gravity, stability (resistance to degradation in a specific environment), strength, oxidation resistance, and accelerated cure.

Typically, any filler conventionally used in the art of preparing rubber, latex, and/or sealants, can be employed in its conventional capacity and concentration and for the conventional objective, i.e. anti-oxidants to inhibit oxidation... Possible fillers include anti-oxidants, antifoam agents, defoaming agents, curing agents, bacteriacides, and cure accelerators; such as Butyl Zimate® (zinc di-n-butyldithiocarbamate), Vanox® GT (tris(3,5-di-t-butyl-4-hydroxybenzyl)isocyanurate), Setsit® 5 (activated dithiocarbamate blend), and dispersed sulfur (sulfur) produced by R.T. Vanderbilt Co., Inc., Norwalk, CT, Colloid 987 produced by Colloids, Inc., Newark, NJ, Dowacide "A" (bacteriacide) produced by Dow Chemical, Acrysol® TT-615 (acrylic emulsion copolymer) produced by Rohm and Haas Co., Philadelphia, PA, water, ammonium hydroxide, potassium titanate, and zinc oxide, among others.

Generally, between about 0.05 wt% to about 2 wt% anti-oxidant is used to help improve the sealant stability at high temperatures. Typical anti-oxidants include: Vanox GT and Agerite Superlite, produced by Vanderbuilt Co., Norwalk, CT, among others.

Up to about 1 wt% anti-foaming and defoaming agents are typically used, with between 0.05 wt% and 1 wt% preferred. Since, during sealant production, the butyl rubber and ethylene propylene latices have a tendency to foam, anti-foaming and defoaming agents are preferably employed. Typical anti-foaming agents include: Hodag PX-139-Hodag produced by Chemical Corp., Skokie Illinois, Colloidad 999, produced by Colloids Inc., among others. Typical defoaming agents include: Colloid 987 and Hodag PX 218 produced by Colloids Inc. and Chemical Corp., among others. Note, the anti-foaming agents and defoaming agents are not necessary, they are merely processing aides.

The viscosity of the precured sealant can be adjusted via the addition of a thickener, such as Acrysol TT-615, to attain the optimum viscosity for the given application. Typically, a caulk like consistency is preferred for face type seals so that a bead, which will maintain its shape until compressed between components, can be extruded. In edge type seals, on the other hand, flow is important to ensure a complete, air tight seal. Therefore, a low viscosity, paint-like consistency is preferred, viscosity between about 43 and about 46 sec. as measured with Zahn #1 cup. This paint like viscosity can be attained without the addition of thickener, such as by using ingredients and proportions specified in Example I.

Vulcanization (cure) and improved strength of the sealant is attained with curing agents and curing accelerators. Generally, between about 5 wt% to about 15 wt% combined curing agents and curing accelerators are used. Typical curing agents include: dispersed sulfur, produced by Vanderbuilt Co., Norwalk, CT, and para-quinose dioxime, produced by Synthetic Co., Norwalk, CT., among others. Typical curing accelerators include: butyl Zimate, Setsit 5, and Vanox, among others.

Bacteriacides should be used if the sealant will be stored before use. While in storage, without the use of a bacteriacide, the sealant can become contaminated with bacteria and/or mold which can cause sealant degradation. Typically, between about 3 wt% to about 15 wt% bacteriacide is used. Bacteriacides include: Dowacide "A" produced by Dow Chemical Co., Midland, MI, and Vancide 51Z-RT produced by Vanderbuilt Co., Norwalk, CT, among others.

A method of preparing the sealant consists of mixing the butyl rubber and ethylene propylene latices, and any fillers in a mixer until essentially homogeneous. The pH of the mixture is tested, and adjusted if necessary, to attain a pH between about 9 and about 10.5 to prevent precipitation of any of the ingredients. Air bubbles are removed from the mixture by adjusting the speed of the blender such that a depressed vortex in the mixture is formed. The vortex causes trapped air bubbles and foam within the mixture to surface. Using a pipet (or similar device), the air bubbles and foam are removed. The mixture is then filtered to remove any lumps. Finally, filler material can be blended into the mixture. Again, a vortex is formed by adjusting the blender speed to cause air bubbles and foam to surface. The air bubbles and foam are subsequently removed, and the mixture is strained. Note, removal of essentially all of the air bubbles is important since air causes porosity in the sealant, and a potential leak path. Once essentially all of the air is removed, the desired sealant consistency has been attained, and the sealant is homogeneous, it can be applied to a fuel cell component.

Application of the sealant to the fuel cell component, or other substrate requiring sealing, can be preformed by any conventional means. Some conventional means include: a syringe, caulk gun, or a dispensing system such as Zeta 1400 manufactured by Loctite Corp., Newington, CT, or other extrusion method, painting, spraying, among other techniques. The sealant is generally applied to the frame portion of a framed fuel cell component. The sealant can be applied to the face of the frame (see FIG. 3B) to act as a seal between adjacent frames when the components are stacked, or on the edge of a frame (see FIG. 3A) as a seal between the frame and the cell.

Once the sealant is applied to the component, the sealant can either be cured prior or subsequent to assembling the fuel cell. If the sealant is to be cured prior to assembling the fuel cell, the sealant is allowed to dry in air for about 2 to about 4 hours and then cured at a temperature between about 220° F. and about 250° F., with about 230° F. for about one hour preferred. Alternatively, if the sealant is to be cured subsequent to assembling the fuel cell, the components are assembled with uncured sealant and then the entire assembly is heated to between about 220° F. and about 250° F. for approximately 1 hour to cure the sealant. Curing the sealant subsequent to assembling the fuel cell attains better sealant conformability, and is therefore preferred. Note, the cured sealant has a specific gravity of approximately 1, typically between about 1.02 and 1.06.

Figure 3A:
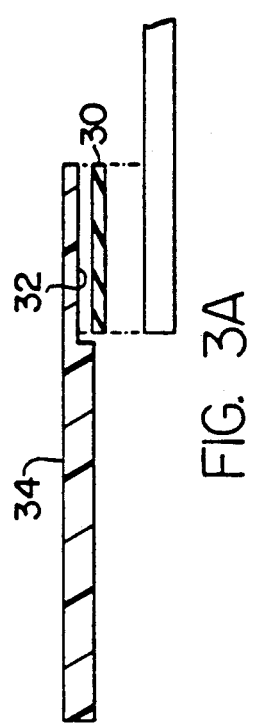
FIG. 3 is a schematic of one embodiment of the sealant of the present invention.
Figure 3B:
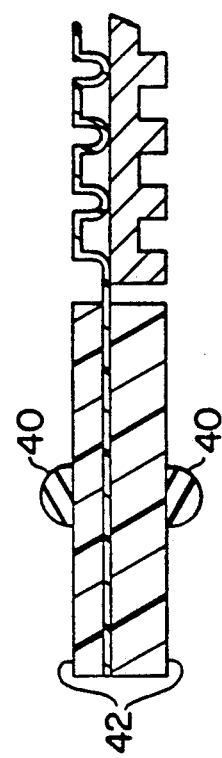
Figure 2:
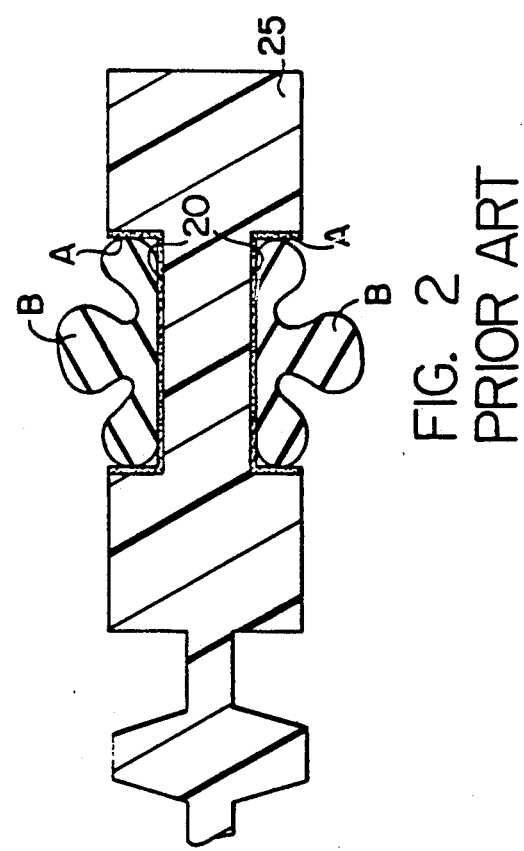
FIG. 2 is a schematic of the prior art rubber sealant.

Referring to FIGS. 3A and 3B, which are meant to be exemplary not limiting, two of the areas in which the sealant can be used are shown: as an edge seal (FIG. 3A) and a face seal (FIG. 3B). As an edge seal, the sealant 30 is placed on a step 32 in the frame 34. As a face seal, the sealant 40 is placed on the face of the frame 42. With respect to the prior art (see FIGS. 1 and 2), it is clear that the frame thickness can be significantly reduced via the use of the present invention. For example, the frame thickness for the prior art was 0.120 inches overall with two 0.032 inch grooves for the face seal (FIG. 2). With the present invention (FIGS. 3A and 3B), the frame thickness for the edge seal can be less than 0.02 inches, while the thickness for the face seal can be less than 0.06 inches.

The invention will be clarified by reference to the following illustrative example. The example is given to illustrate a method for preparing the sealant of the present invention. It is not, however, intended to limit the generally broad scope of the present invention.

EXAMPLE I

This procedure has been employed to prepare butyl-/ethylene propylene diene terpolymer latex sealant having 75 wt% butyl rubber and 25 wt% ethylene propylene diene terpolymer with a paint-like consistency.

1. 121 g butyl rubber, BL 100 (62%) produced by Burke-Palmason Chemical Company, Pompano Beach, FL, was added to 50 g (grams) ethylene propylene diene terpolymer in a glass beaker.

2. 3.8 g ammonium hydroxide (30%), 24.5 g water and 0.7 g Dowacide. "A" (10%) were added to the beaker.

3. The latex mixture was blended at a medium speed setting with a Lightin Model V-7 mixer for 1.5 minutes until homogeneous.

4. The pH of the mixture was then tested with pH, litmus, paper. If the pH was not between 9.5 and 10.0 it was adjusted by adding 30% ammonium hydroxide to prevent the precipitation of some of the ingredients.

5. The mixing was continued at an initial slow speed setting for 2.5 hours until the mixture was smooth and air free. During the mixing, the speed was adjusted to create a small depressed vortex, causing air bubbles and foam in the mixture to rise to the surface where they were removed via a pipet.

6. The mixture was then strained into another beaker to remove any lumps.

7. A premix of 5 g Setsit. 5 and 10 g water was prepared.

8. 8 g of zinc oxide (60%), 2.9 g of sulfur (68%), the premix, 8 g of Butyl Zimate (50%), 2 g of Vanox. GT (50%), and 0.5 g of Colloid 987 was added to 200 g of the mixture.

9. The mixture was mixed for 1.5 hours. Air bubbles and foam were removed as in step 5 by again using a vortex to cause any air bubbles and foam to surface.

10. The latex mixture was then strained and stored for subsequent use.

When the above described sealant was cast into a film, 0.025 to 0.050 inches thick on a glass plate, air-dried overnight, and cured at 220°-230° F. for 2 hours, it exhibited a tensile strength of at least 450 psi, an elongation percent of at least 800%, with a specific gravity of approximately 1.

EXAMPLE II

A butyl/ethylene propylene diene terpolymer latex sealant having 75 wt% butyl rubber and 25 wt% ethylene propylene diene terpolymer with a caulk-like consistency. The sealant is prepared similar to Example I, except 12 g of Acrysol TT 615 is added to the butyl rubber and ethylene propylene diene terpolymer in the glass beaker (step 1) prior to adding the ammonium hydroxide (step 2).

The sealant of Example II exhibited a tensile strength of at least 300 psi, an elongation percent of at least 100%, with a specific gravity of approximately 1.04.

The use of the sealant of the present invention a frame thickness reduction of up to 85% or can allow a frame thickness reduction of up to 85% or greater since it is not necessary to have a groove in the frame to contain the uncured rubber during molding for a face seal. The sealant can be applied as an extruded bead of almost any size as needed in a particular application.

Although this invention has been shown and described with respect to detailed embodiments thereof, it will be understood by those skilled in the art that various changes in form and detail thereof may be made without departing from the spirit and scope of the claimed invention.

We claim:

1. A fuel cell, said fuel cell having framed components including a cathode electrode, an anode electrode, and an electrolyte therebetween, a cathode chamber on the nonelectrolyte side of said cathode electrode, an anode chamber on the nonelectrolyte side of said anode electrode, wherein the improvement comprises the use of a sealant to prevent leakage of fuel, oxidant, reaction products, and electrolyte, said sealant located on the frame portion of said framed components, wherein when the framed components are stacked, the sealant forms a seal between adjacent frames; whereby the sealant comprises a mixture of between about 50 wt% to about 90 wt% butyl rubber and about 10 wt% to about 50 wt% ethylene propylene latices.

2. A fuel cell as in claim 1, wherein said sealant further comprises up to about 25 wt% fillers.

3. A fuel cell as in claim 2 wherein said fillers are selected from the group consisting of anti-oxidants, water, curing agents, cure accelerators, thickeners, antifoaming agents, defoamers, bacteriacides, potassium titanate, and combinations thereof.

4. A fuel cell as in claim 1 wherein said ethylene propylene latex is ethylene propylene diene terpolymer.

5. A fuel cell as in claim 1 wherein said butyl rubber is isobutylene copolymer.

6. A fuel cell as in claim 1 wherein said electrolyte is selected from the group consisting of potassium hydroxide electrolytes and solid polymer electrolytes.

7. A fuel cell, said fuel cell having framed components including a cathode electrode, an anode electrode, and an electrolyte therebetween, a cathode chamber on the nonelectrolyte side of said cathode electrode, an anode chamber on the nonelectrolyte side of said anode electrode, wherein the improvement comprises the use of a sealant to prevent leakage of fuel, oxidant, reaction products, and electrolyte, said sealant located on the frame portion of said framed components, wherein the sealant forms a seal between the frame and the component; whereby the sealant comprises a mixture of between about 50 wt% to about 90 wt% butyl rubber and about 10 wt% to about 50 wt% ethylene propylene latices.

8. A fuel cell as in claim 7, wherein said sealant further comprises up to about 25% fillers.

9. A fuel cell as in claim 8 wherein said fillers are selected from the group consisting of anti-oxidants, water, curing agents, cure accelerators, thickeners, anti-foaming agents, defoamers, bacteriacides, potassium titanate, and combinations thereof.

10. A fuel cell as in claim 7 wherein said ethylene propylene latex is ethylene propylene diene terpolymer.

11. A fuel cell as in claim 7 wherein said butyl rubber is isobutylene copolymer.

12. A fuel cell as in claim 7 wherein said electrolyte is selected from the group consisting of potassium hydroxide electrolytes and solid polymer electrolytes.

* * * * *